(12) United States Patent
Borsuk

(10) Patent No.: US 6,746,788 B2
(45) Date of Patent: Jun. 8, 2004

(54) CONCENTRATION CELLS UTILIZING EXTERNAL FIELDS

(76) Inventor: Norman K Borsuk, P.O. Box 1671, Alameda, CA (US) 94501

( * ) Notice: Subject to any disclaimer, the term of this patent is extended or adjusted under 35 U.S.C. 154(b) by 349 days.

(21) Appl. No.: 10/047,153

(22) Filed: Jan. 14, 2002

(65) Prior Publication Data

US 2003/0134160 A1 Jul. 17, 2003

(51) Int. Cl.[7] .................... H01M 14/00; H01M 16/00; H01M 6/50
(52) U.S. Cl. ........................................ 429/10; 29/623.1
(58) Field of Search ............................ 429/10; 29/623.1

(56) References Cited

U.S. PATENT DOCUMENTS 4,469,759 A * 9/1984 Newill ........................ 429/10
5,888,663 A * 3/1999 Frazier et al. ............... 429/10
6,355,166 B1 * 3/2002 Amarasinghe et al. ...... 210/223
6,479,176 B2 * 11/2002 Leddy et al. ................ 429/10

* cited by examiner

Primary Examiner—Hoa Van Le

(57) ABSTRACT

A method of producing concentration cells applicable to generating electricity. An external field is used to cause a translational displacement of small-volumed concentration differences that are existent within a heterogeneous fluid, to create a concentration cell between various electrodes in contact with the fluid. The field can be gravitational, magnetic, electric, or a combination. In some embodiments, field sources are preset to focus the displacement of the small volumes near localized regions surrounding preselected electrodes.

15 Claims, 7 Drawing Sheets

CONCENTRATION CELLS UTILIZING EXTERNAL FIELDS

CROSS-REFERENCE TO RELATED APPLICATIONS

Not applicable.

FIELD OF THE INVENTION

This invention relates to concentration cells that are created by the action of an external field on the inhomogeneous distribution of chemical species within electrolytes and the utilization of the concentration cells to produce electricity including electric batteries that can be thermally reconditioned by the user.

BACKGROUND OF THE ART

Concentration cells are long known but have had only minor success in broad commercial application in the field of electrical production, especially failing in the field of commercial electric batteries. Yet the use of concentration cells is attractive because the fundamental process permits the regeneration of the electric potential of battery devices by thermal processes rather than by use of externally supplied electricity as is common today for many commercially available batteries. The user's ability to recondition an economically competitive battery by simple thermal processes rather than electrical recharging would provide the user with additional and useful choices for selecting an electric battery and would be an important contribution to the industry.

U.S. Pat. No. 4,292,378 to Krumpelt et al. (1981) describes a system and method for a thermally regenerable concentration cell. Their invention emphasizes the problems in this field that are in need of remedy. Their invention includes a large number of components such as containments for anode and cathode, an ion exchange member, electrical inductors, a distillation column, a pump, and a storage tank. Their invention is not useful to users of commercial batteries because of its obvious physical bulk and complexity, nor is it economically competitive to presently available batteries that are electrically rechargeable. However, their invention does inform of the applicability and potential usefulness of electrochemical concentration cell processes in applications where utilization of solar heat or low grade waste heat is available.

U.S. Pat. No. 6,322,676 B1 to Leddy et al. (2001) describes systems that utilize magnetic fields and concentration gradients to enhance the performance of a variety of electrochemical processes and devices. Their inventions utilize short range magnetic fields that are sourced from magnetized microbeads that are incorporated into an ion exchange polymer forming a composite material. These fields then modify the flux of certain magnetic components within the electrolyte as it passes through the magnetic composite material. This teaches the value of using short range fields to effect a useful manipulation of chemical components within a electrolyte. However, the use of a composite material with microscopic channels restricts the movement of reactive chemical components that have countercurrent flows that are prevalent in the electrochemistry of concentration cells. Additionally, the invention by Leddy et al. does not take advantage of concentration gradients or electrolyte inhomogeneities that exist outside of the composite material and that are valuable to the operation of a thermally regenerable electric battery.

SUMMARY OF THE INVENTION

It is therefore an object of this invention to provide novel methods which utilize external fields, electrodes, and electrolytes to create improved concentration cells that generate electricity.

Another object of this invention is to provide an improved thermally reconditionable concentration cell that generates electricity.

This invention significantly departs from and improves over the prior art by novel methods that utilize external fields, electrodes and electrolytes to create a concentration cell.

One advantage of the invention is that it uses the action of a field on gradients or concentration inhomogeneities that are intrinsic to a volume of electrolyte.

Another advantage of the invention is that the arrangement of field and electrodes can be specialized to maximize the displacement of the components within the electrolyte based on their size and other of their properties.

Another advantage of the invention is that the electrodes and field source elements can be placed with precision very close to each other.

Another advantage of the invention is that specific electrodes and field sources can be of one material and construction.

Another advantage of the invention is that the displacement of concentration inhomogeneities by the field can be focused to localized regions.

Another advantage of the invention is that it can be thermally reconditioned.

Another advantage of the invention is that it can be made to operate with a wide variety of electrolytes and fields and electrode materials.

Another advantage of the invention is that it can be designed to operate in many different temperature environments.

Another feature of the invention is that both anode and cathode can be of the same material.

Another feature of the invention is that the anode and cathode are determined by the action of an external field on subvolumes existent within the electrolyte Another feature of the invention is that it can be used in conventional electrical circuits.

Another feature of the invention is that it can be modified to give a variety of output voltages and power levels.

DETAILED DESCRIPTION OF THE PREFERRED EMBODIMENTS

Figure 1:
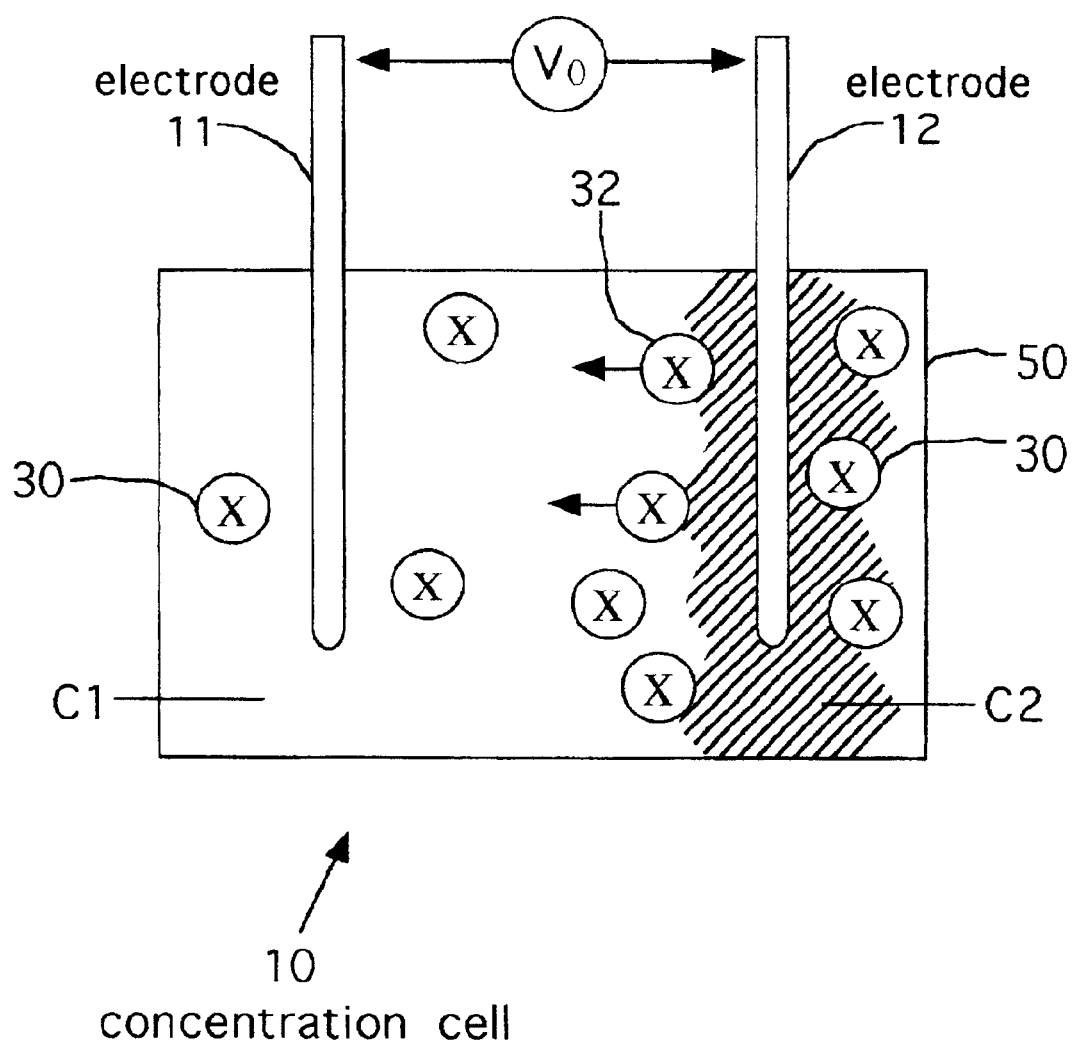
FIG. 1 shows a representation of a fundamental concentration cell.

In FIG. 1, a concentration cell 10 is represented to show the fundamental principles of a simple cell that generates electricity. The cell contains two electrodes, an electrode 11 and an electrode 12, that are placed in different regions of an enclosure 50. A volume of electrolyte containing a chemical species 30, which is representative of an atom or molecule or ion, fills the enclosure. The species is not evenly distributed in the enclosure, having a molarity or a concentration C1 near electrode 11 that is less than a concentration C2 near electrode 12. A net diffusion of the species from concentration C2 to concentration C1, as represented by a moving particle 32, will eventually cause an equalization of the two concentrations. The spontaneous diffusion of the particles from a high concentration to a lower one has a free energy $\Delta G$ given by $$\Delta G = (RT)\ln(C1/C2),$$

where R is the gas constant, T is temperature in Kelvin. With proper choice or mating of the electrode material and the chemical species, the free energy of the diffusion reaction may be used to generate electricity. An important indicator of the reaction is a voltage $V_O$, that is dependent on the free energy and is derived from the Nernst equation such that $$V_O = -\Delta G/n_e F,$$

where F is one Faraday and $n_e$ is the number of electrons transferred per particle in the electrochemical reactions at the electrodes.

The present invention utilizes an external field to move and to collect or aggregate similar types of concentration inhomogeneities that may exist or be caused to exist in subvolumes within electrolytes. Both the movement and aggregation are achieved by utilizing specific differences in the properties of the various chemical components or species that compose the electrolyte. Examples of these properties are mass density, electric moments, and magnetic susceptibility.

Figure 2A:
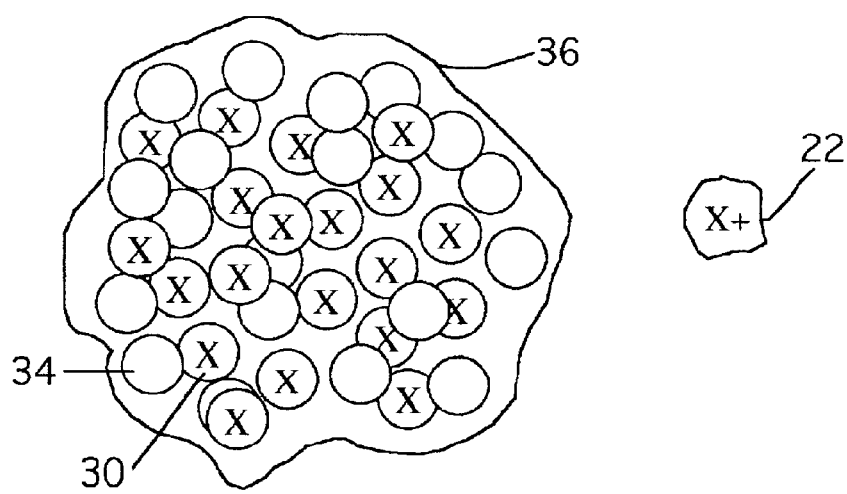
FIGS. 2A–2C show representations of a subvolume of electrolyte containing three different concentrations of a chemical species.
Figure 2B:
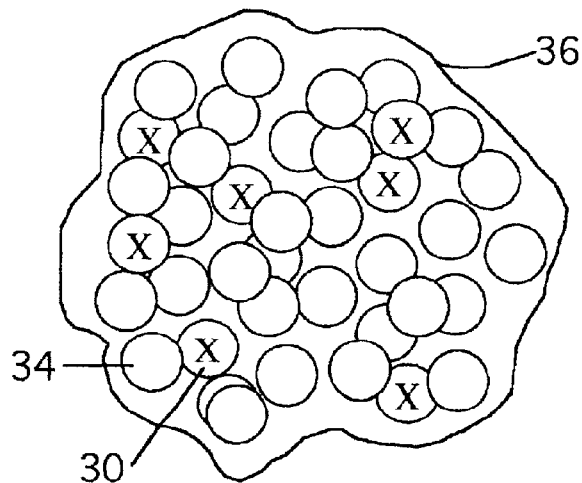
Figure 2C:
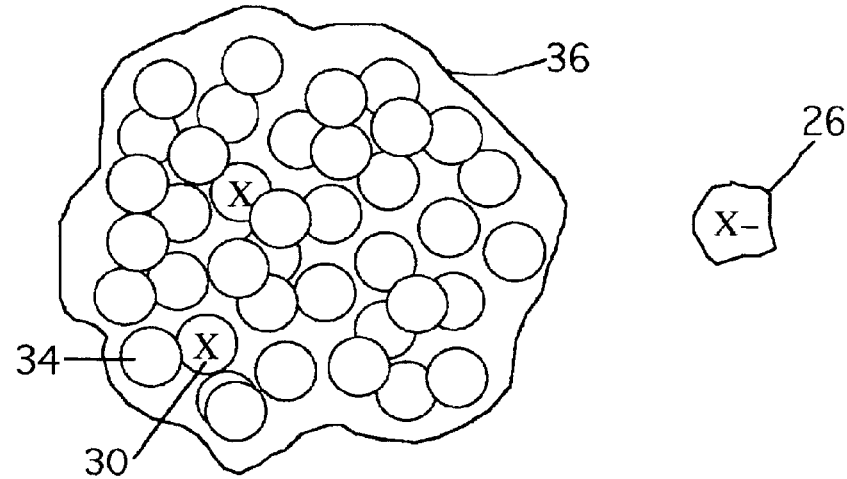

FIGS. 2A through 2C each show a representation of a subvolume 36 that is existent within a larger volume of fluid such as the volume of electrolyte filling enclosure 50 in FIG. 1. Each representation shows the same sized subvolume but each has different molarities of chemical species 30. A particle 34 represents all other chemical species within the fluid. FIG. 2B shows subvolume 36 containing a molarity of the species that is equal to the average molar value of the fluid. FIG. 2A shows subvolume 36 with a higher-than-average molarity which is abbreviated as a subvolume 22. FIG. 2C shows subvolume 36 with a lower-than-average molarity which is is abbreviated as a subvolume 26. Subvolume 22 and subvolume 26 are illustrative of concentration inhomogeneities that can be acted on by an external field to create a useful concentration cell.

Embodiments Utilizing a Gravitational Field

Figure 3A:
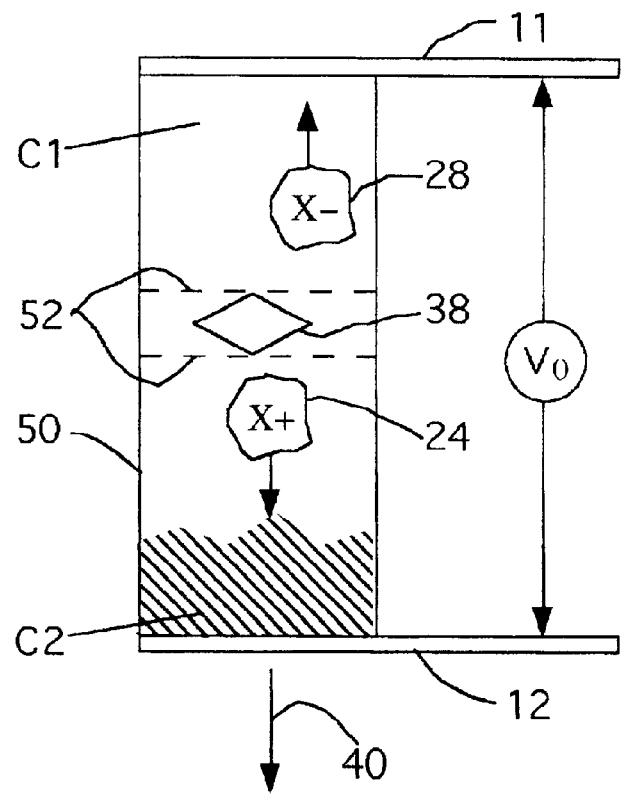
FIGS. 3A and 3B show representations of embodiments of the invention
Figure 3B:
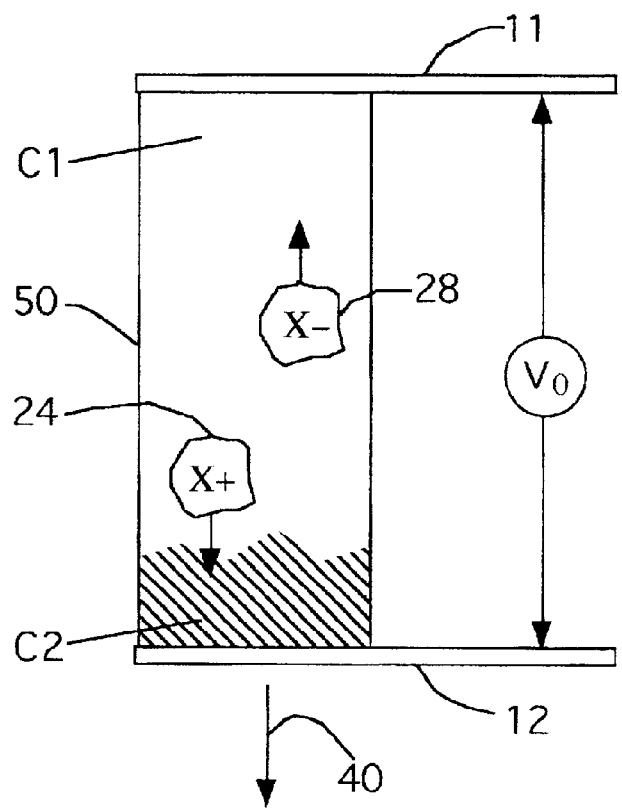

FIG. 3A and FIG. 3B show embodiments of my invention that have been tested and confirmed. Electrode 11 and electrode 12 are both composed of copper metal. Both electrodes are are held separate from each other by enclosure 50 which is composed of a rigid material that is chemically inert and electrically nonconductive. Enclosure 50 also holds a dilute aqueous solution of $CuSO_4$ which fills the enclosure's volume and contacts both electrodes. A small quantity of solid $CuSO_4$ 38 is held in place within the solution by a screen 52, which is secured to the walls of the enclosure, and which permits the free flow of solution through it.

The cell is shown to be held stationary in a vertical position with electrode 11 on top and electrode 12 on the bottom relative to a field direction 40 from earth's gravitational field. When the temperature of the cell is increased, the solubility of the salt is increased in the aqueous solution. As solid 38 dissolves into solution, subvolumes of solution that are localized around the salt attain a temporarily higher solute concentration compared to regions or subvolumes of the solution that are distant from the dissolving salt. The regions or subvolumes containing a temporarily higher solute concentration are subvolumes 22 from FIG. 2. Due to their increased $CuSO_4$ content, they have a greater mass density than the surrounding solution and will sink towards the surface of electrode 12 due to the field. This sinking or directed translational displacement of subvolumes having a higher than average $CuSO_4$ concentration is represented by a subvolume 24. A subvolume 28 represents subvolumes of the solution that have a smaller than average concentration, that rise or are translationally displaced in a direction opposite to that of subvolume 24. Voltage $V_O$, obtained between the two electrodes, is a function of the ratio of concentration C1 at electrode 11 and concentration C2 at electrode 12, and is essentially that given by the Nernst equation. I've found that the cells in these embodiments behave similarly to common electric batteries where for example, 5 cells connected in series produce approximately 5 times the output voltage of a single cell. I've also found that when solid 38 has dissolved so that it is no longer visually discernible, or that it is submacroscopic in size, the cell will continue to generate a voltage indicative of the continued displacement of subvolumes that are very small in size. In this instance, screen 52 and solid 38 are not necessary. FIG. 3B represents an embodiment that differs from that in FIG. 3A, only in that screen 52 and macroscopic sized solid 38 are omitted.

As represented in FIGS. 3A and 3B, electrode 12 becomes cathodic and electrode 11 becomes anodic. A consequence of the invention as given in the embodiments of FIGS. 3A and 3B is that by inverting the cell so that electrode 12 is on top and electrode 11 is on the bottom, then electrode 11 becomes cathodic and electrode 12 becomes anodic. This shows that the polarity of voltage $V_O$ is dependent on the orientation of the cell to the field. In the embodiments as represented in FIGS. 3A and 3B, the bottom electrode is always the cathode and the top is always the anode.

The embodiments in both FIGS. 3A and 3B can be thermally reconditioned for repeated generation of electricity by exposing the cells to a cold temperature reservoir. This thermal processing reduces the solubility of the salt in solution, causing the precipitation or reformation of solid 38, thus returning the cells to their original conditions.

Embodiments Utilizing Magnetic Fields

Figure 4A:
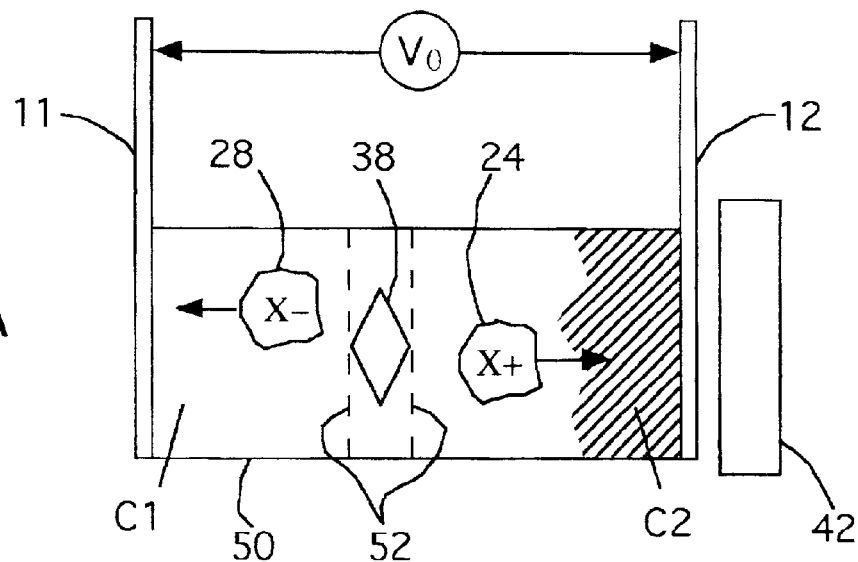
FIGS. 4A and 4B show representations of additional embodiments of the invention
Figure 4B:
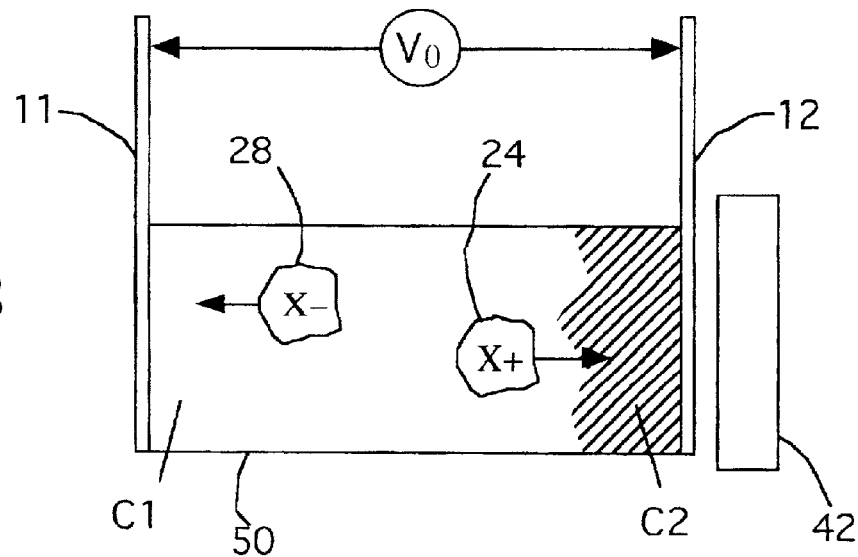

FIG. 4A and FIG. 4B show embodiments of my invention that have been tested and confirmed. Both embodiments are identical to those respectively in FIGS. 3A and 3B except that the gravitational field is replaced by an inhomogeneous magnetic field that is sourced from a field sourcing unit, a magnet 42. Electrode 11 and electrode 12 are both composed of copper metal and are held separate from each other by container 50 which is composed of a chemically inert and electrically nonconductive material and which holds a liquid aqueous solution of $CuSO_4$. Since $CuSO_4$ is paramagnetic and water is diamagnetic, subvolumes that have a higher $CuSO_4$ concentration will have a greater paramagnetic value and will be displaced by the inhomogeneous field towards magnet 42. Consequently, the molarity of $CuSO_4$ will be increased at the surface of electrode 12 which is placed in between the magnet and the electrolyte. Subvolume 22 from FIG. 2, that is being translationally displaced or is in motion due to the field is represented by a subvolume 24 in FIGS. 4A and 4B. Subvolume 26 from FIG. 2, that is being translationally displaced due to the field is represented by a subvolume 28 in FIGS. 4A and 4B. Screen 52 is used to retain solid 38 in FIG. 4A. Voltage $V_O$, obtained between the two electrodes, is a function of the ratio of concentration C1 at electrode 11 and concentration C2 at electrode 12, and is essentially that given by the Nernst equation. I've found that the cells in these embodiments behave similarly to common electric batteries where for example, 5 cells connected in series produce about 5 times the output voltage of a single cell.

As shown in FIGS. 4A and 4B, electrode 12 becomes cathodic and electrode 11 becomes anodic. A consequence of the invention as given in the embodiments of both FIGS. 4A and 4B is that by resetting magnet 42 next to electrode 11, then electrode 11 becomes cathodic and electrode 12 becomes anodic. This shows that the polarity of voltage $V_O$ is dependent on the orientation of the cell to the field. In the embodiments of FIGS. 4A and 4B, the electrode nearest to magnet 42 is always the cathode and the electrode distant from the magnet is always the anode.

The embodiments in both FIGS. 4A and 4B can be reconditioned for repeated generation of electricity by exposing the cells to a cold temperature reservoir. This thermal treatment reduces the solubility of the salt in solution, causing the precipitation or reformation of solid 38, thus returning the cells to their original conditions.

Embodiments Utilizing Focused Magnetic and Electric Fields

Figure 5A:
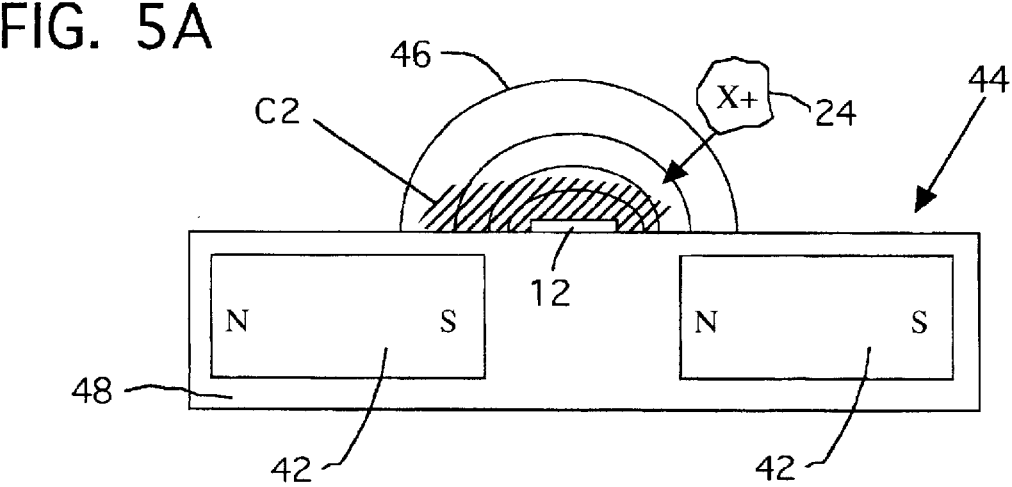
FIG. 5A shows an arrangement of the field sourcing units and electrode.

FIG. 5A shows an assembly 44 containing a field sourcing unit 42, which may be a magnet, an electret, or a combination of the two, which creates a field 46 that focuses towards electrode 12. Electrode 12 and field sourcing unit 42 are held in predetermined arrangement by a substrate 48. Field 46 focuses the translational displacement of subvolume 24 towards to a localized region near the surface of electrode 12 where concentration C2 is thus formed. Substrate 48, shown to encase field sourcing unit 42, should be an inert material; one that does not chemically react with the electrolyte and that does not conduct electricity. Electrode 12 can be placed onto substrate 48 by various mechanical methods, by processes such as microlithography, and other techniques known to those skilled in the art.

Figure 5B:
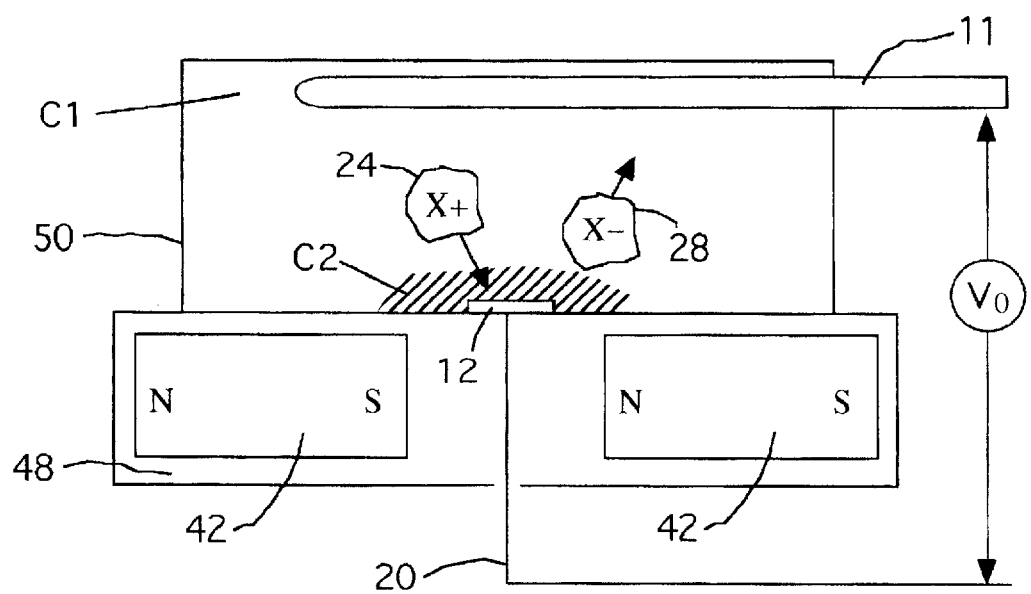
FIG. 5B show representations of additional embodiments of the invention

FIG. 5B shows an embodiment of the invention utilizing the prearranged assembly of field sourcing unit 42 as shown in FIG. 5A. Electrode 12 is shown to be placed where concentration C2 will be most pronounced due to the focused aggregation of subvolume 24 and the repulsion of subvolume 28. A conductor 20 electrically connects electrode 12 to the outside of the cell. Similar to the previous embodiments, electrode 11 contacts the fluid having concentration C1, and voltage $V_O$ is a function of the ratio of concentration C1 at electrode 11 and concentration C2 at electrode 12. Enclosure 50 should be firmly attached to substrate 48 so that the electrodes, volume of fluid, and the field sources are maintained in stationary positions relative to each other.

Figure 6A:
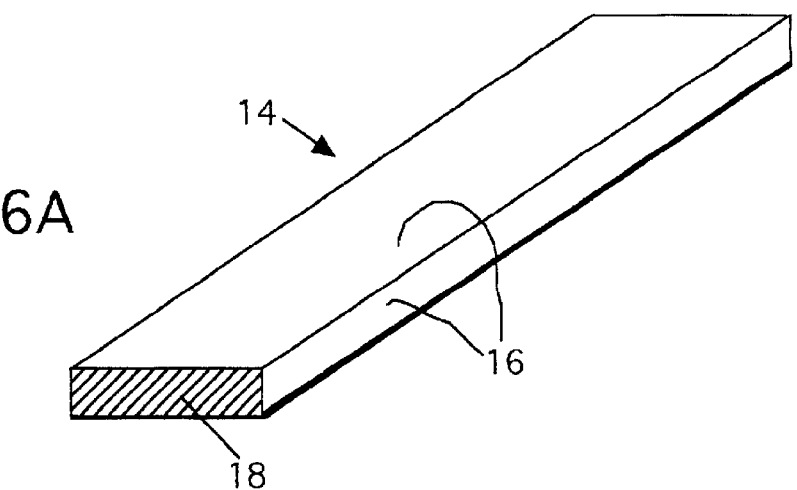
FIGS. 6A–6C show details of another arrangement of the field sourcing units and electrode.
Figure 6B:
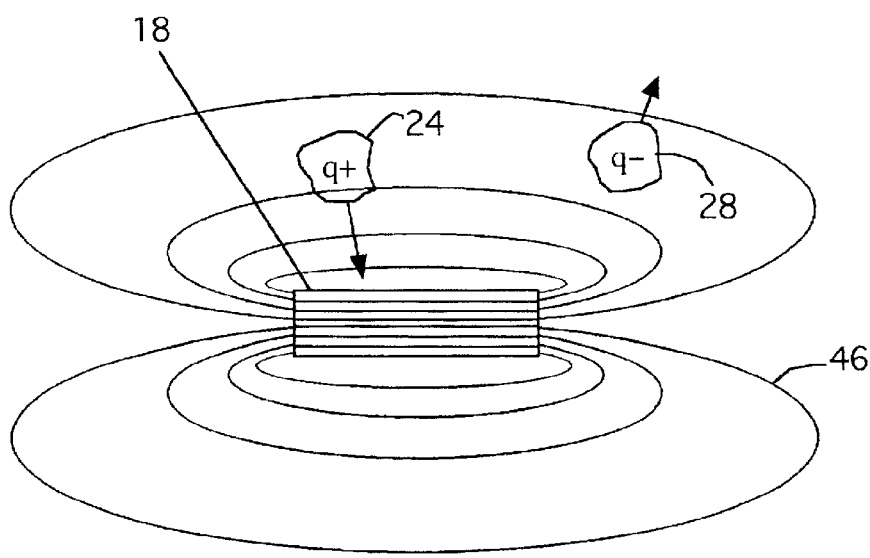
Figure 6C:
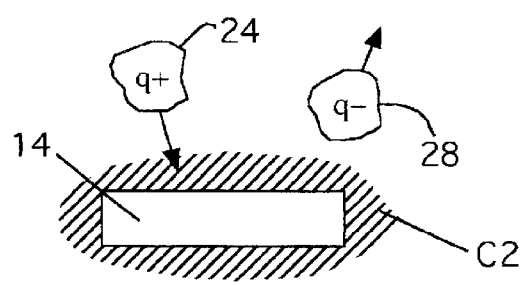

FIGS. 6A through 6C show detail of an electrode 14 that simultaneously functions as both the field sourcing unit and electrode. There are two general types of electrode 14 represented in the series of illustrations; The first type is where electrode 14 is composed of field sourcing material, such as that of a magnet or an electret, that both sources a field and performs as an electrode. This is viable so long as the material is electrically conductive and the electrolyte does not adversely react with it. The second type is where the field sourcing material is coated with electrically conductive material that protects the field sourcing material from chemical contact with the electrolyte and that provides an electrode function.

In FIG. 6A, electrode 14 has a ribbon-like shape and an exterior surface 16 that can be coated or plated with an electrically conducting material suitable for contact with the electrolyte. The coating, if necessary, can be applied by vapor deposition or other techniques known to those skilled in the art. An interior 18 of electrode 14 can thus protected in the art. FIG. 6B shows field 46 sourced from interior 18 and focusing towards the electrode's exterior surface 16. Subvolume 24 is translationally displaced into the field while subvolume 28 is displaced from the field. FIG. 6C shows the formation of concentration C2 around electrode 14 due to the displacements of subvolume 24 and subvolume 28.

Figure 6D:
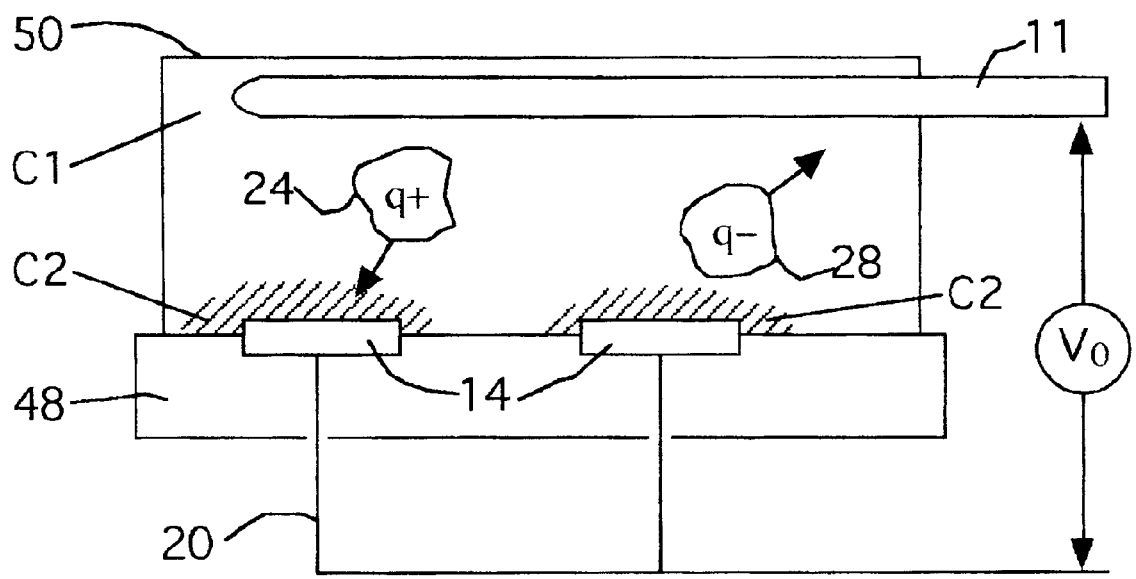
FIG. 6D shows a representation of an additional embodiment of the invention

FIG. 6D shows an embodiment of the invention utilizing electrode 14 as represented in FIGS. 6A through 6C. Electrode 14 is shown to be mounted in substrate 48; an inert material that holds the electrode in position but that provides for some exposure of the electrode's surface to the electrolyte that is contained within the volume enclosed between enclosure 50 and substrate 48. Concentration C2 forms around the exposed surface of electrode 14 due to the aggregation of subvolume 24 and the repulsion of subvolume 28. Conductor 20 electrically connects electrode 14 to the outside of the cell. Similar to the previous embodiments, electrode 11 is in contact with concentration C1, and voltage $V_O$ is a function of the ratio of concentration C1 at electrode 11 and concentration C2 at electrode 14. Container 50 should be firmly attached to substrate 48 so that the electrodes and the electrolyte are maintained in stationary positions relative to each other.

CONCLUSION, RAMIFICATIONS, AND SCOPE

Accordingly, this invention utilizes external fields, electrodes, and electrolytes containing subvolumes that have varying molarities of chemical species, in a novel manner to produce concentration cells that are readily applicable to electric battery applications. Furthermore, the embodiments illustrated here show that the invention creates a battery that can be thermally reconditioned;

can utilize other electrolytes besides the aqueous $CuSO_4$ solutions described here, such as other salt solutions, molten salts, or electrolytes near critical phase transition points such as subcritical or supercritical electrolytes, and other electrolytes which have intrinsic macroscopic or submacroscopic subvolumes that have molar variations of chemical species;

can utilize various arrangements of the field and electrodes;

has a voltage polarity that is dependent on the orientation of the cell to the external field;

has an electrical output that can be regulated by adjusting the orientation of the cell to the external field;

can utilize other electrode materials other than the copper metal electrodes described here;

can focus the translational movement and aggregation of various subvolumes to localized regions where electrodes can be placed;

can utilize electric fields sourced from electrets for some electrolytes;

can utilize magnetic fields sourced from magnets for some electrolytes; and can utilize gravitational fields, magnetic fields, electric fields, or a combination of these fields for some electrolytes.

It should, of course, be noted that the present invention has been described in reference to illustrative embodiments. Various alternatives and modifications can be devised by those skilled in the art without departing from the invention. Accordingly, the present invention is intended to embrace all such alternatives, modifications and variances which fall within the scope of the appended claims.

I claim:

1. A method for creating a concentration cell for generating electricity comprising the steps of:

providing a first electrode having a first placement and a second electrode having a second placement; and providing a volume of electrolyte that contacts said first electrode and said second electrode and that contains subvolumes which have higher-than-average molarities of a chemical species that is existent within said volume of electrolyte; and providing a field that extends into said volume of electrolyte and that causes said subvolumes to be translationally displaced towards said first electrode; and holding said volume of electrolyte and said first electrode and said second electrode in stationary position relative to said field, so that the translational displacement of said subvolumes increases the molarity of said chemical species near the surface of said first electrode.

2. The method of claim 1 wherein said field is magnetic.

3. The method of claim 1 wherein said field is electric.

4. The method of claim 1 wherein said field is gravitational.

5. The method of claim 1 wherein said field is a combination of two or more of electric, magnetic, and gravitational fields.

6. A method for creating a concentration cell for generating electricity comprising the steps of:

providing a first electrode having a first placement and a second electrode having a second placement; and providing a volume of electrolyte that contacts said first electrode and said second electrode and that contains subvolumes which have higher-than-average molarities of a chemical species that is existent within said volume of electrolyte; and placing one or more field sourcing units in a predetermined arrangement relative to said first electrode such that said field sourcing units create afield that extends into said volume of electrolyte, that focuses towards said first electrode, and that causes said subvolumes to be translationally displaced; and maintaining said volume of electrolyte, said first electrode, said second electrode, and said field sourcing units in stationary position relative to each other so that the translational displacement of said subvolumes by said field causes a change in the molarity of said chemical species in a localized region of said volume of electrolyte where said first electrode is placed.

7. The method of claim 6 wherein said field sourcing units are magnets.

8. The method of claim 6 wherein said field sourcing units are electrets.

9. The method of claim 6 wherein said field sourcing units are a combination of magnets and electrets.

10. The method of claim 6 further including the step of encasing said field sourcing units in an inert substrate.

11. The method of claim 10 further including the step of placing said first electrode onto the surface of said substrate.

12. The method of claim 6 wherein said step of placing field sourcing units includes using said field sourcing units as said first electrode.

13. The method of claim 12 further including the step of mounting said field sourcing units into an inert substrate.

14. The method of claim 6 wherein said step of placing field sourcing units includes coating said field sourcing units with the material of said first electrode.

15. The method of claim 14 further including the step of mounting the coated field sourcing units into an inert substrate.

* * * * *